| FUNCTION PERFORMED | INSTRUCTION WORD | | |
|---|---|---|---|
| | OPERATION | ADDRESS X | ADDRESS Y |
| ADDITION | 01 | 00 | 01 |
| SUBTRACTION | 10 | 00 | 11 |
| ADDITION | 01 | 00 | 10 |
| TO SELECT MEMORY A | 11 | 11 | 11 |
| ADDITION | 01 | 00 | 01 |
| SUBTRACTION | 10 | 00 | 11 |
| ADDITION | 01 | 00 | 10 |
| TO SELECT MEMORY B | 11 | 11 | 10 |

INVENTOR
THOMAS B. LEWIS
BY George J. Netter
ATTORNEY

Jan. 18, 1966 T. B. LEWIS 3,230,513

MEMORY ADDRESSING SYSTEM

Filed Dec. 30, 1960 2 Sheets-Sheet 2

United States Patent Office 3,230,513

Patented Jan. 18, 1966

3,230,513

MEMORY ADDRESSING SYSTEM

Thomas B. Lewis, Endicott, N.Y., assignor to International Business Machines Corporation, New York, N.Y., a corporation of New York Filed Dec. 30, 1960, Ser. No. 79,754

5 Claims. (Cl. 340—172.5)

The present invention relates generally to data processing apparatus, and, more particularly, to a novel memory addressing system for use with such apparatus.

It is conventional practice in the use of data processing apparatus, such as computers for example, to provide input information in the form of coded characters termed "words," the smallest discrete part of which is commonly referred to as a bit. These input or instruction words form the heart about which initial design of such apparatus is determined, i.e., having established the maximum required number of bits per instruction word, the various functional components of the apparatus such as registers, memories, decoders and the like are designed to accommodate input information of this magnitude.

When the machine is of the binary type, the number of bits of information which can be stored and recovered in memory units has a direct functional relationship to the size or magnitude of the basic instruction word. For example, if an instruction word has a magnitude of 10 bits, the total number of locations which can be addressed in a binary system is $2^{10}$ or 1,024. This is easily seen since each bit in a binary system is representable by either one of two possible states, each of which states can logically only stand for a single fact or bit of information, and the total information which can therefore be expressed or conveyed by a word of $n$-bit magnitude is $2^n$. This makes it clear why a primary initial concern in computer design is the instruction word magnitude. In computers, it has also been customary to confine the addressing function of the basic instruction word to but a portion of the total word magnitude. Thus, instruction words are commonly considered as including an operating portion and an addressing portion where addressing of the different locations of a memory section is controlled by the addressing portion of the word alone.

As a direct consequence of this, when it has been desirable or necessary heretofore to increase the memory capacity, and thus addressability, of a computer, this was only considered capable of being accomplished by increasing the instruction word magnitude and, in particular, the address portion of the word. However, as can be implied from the foregoing comments, since the design of the different parts of such a computer are substantially fixed by an initial selection of an instruction word of specific magnitude, it would be necessary to redesign the apparatus to accommodate any increase in instruction word size. Of course, in an already existing computer this is not a feasible process.

It is, therefore, a primary object of the present invention to provide a system for enlarging the memory capability of an already existing computer.

Another object of the invention is the provision of a system for increasing memory addressability of a computer without enlarging instruction word magnitude.

Still another object of the invention is the utilization of special operational information for the selection and addressing of auxiliary computer memories.

A further object is the selection of extra-capacity memory units by operational programming means requiring a minimum amount of additional apparatus.

The foregoing and other objects, features and advantages of the invention will be apparent from the following more particular description of a preferred embodiment of the invention, as illustrated in the accompanying drawings.

Briefly, the invention contemplates utilizing operational instructions of a data processing apparatus for the purpose of energizing auxiliary transfer circuits to provide addressing information to any one of a plurality of different memory units.

Figures 1, 2:
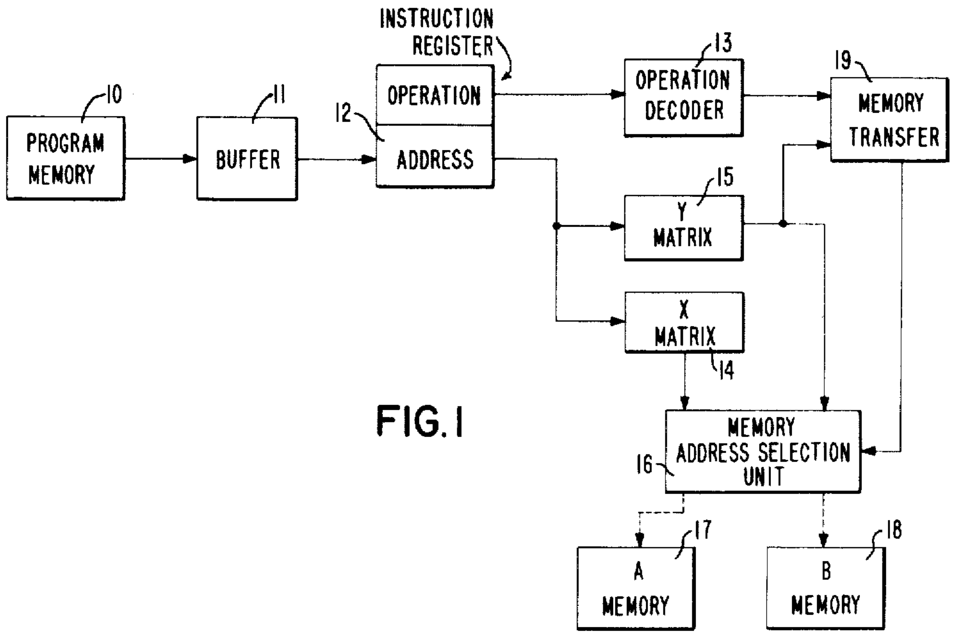
FIG. 1 is a diagrammatic representation of a general mode of the invention in functional block form.
FIG. 2 is a chart of a sample program exemplifying the operation of the invention.

Turning now to FIG. 1, a program memory 10 is provided for containing a series of control signals or instructional information which can be repetitively fed out in a parallel manner to control the different portions of the computer according to a predetermined plan. For our purposes, it shall be assumed that the total parallel output capacity of the program memory is a word of six-bit magnitude. The structural particularities of such a memory will be brought out later.

The output of the program memory is first fed into a buffer 11 which accomplishes two important functions. First, to overcome certain inherent variations in portions of the signals generated by program memories, the buffer samples the incoming signals and converts them into substantially uniform pulses having a high degree of precision. Second, the buffer provides a temporary storage facility to assist in synchronizing the different parts of the apparatus having different access times thereby providing increased speed of overall computer operation. The principle of buffering is well known in the computer art and for that reason the details of operation of this unit will not be entered into herein.

The buffered information is next fed into an instruction register 12 which is shown composed of two major portions, namely, an operation section for accommodating the operation part of instruction words and an address section for handling the address parts. This register provides a temporary storage of the instruction information and also serves to channel it along respective addressing and operational paths.

On reading out, the operation section of the instruction register is presented to the input of an operation decoder 13 which has the capability of converting (decoding) the different possible binary states of the operation section into separate and distinct output signals.

The address section of the instruction register is read out into what are termed an X-matrix 14 and a Y-matrix 15. These matrices have as their function the translation of the encoded address information present at the output of the register. The X and Y coordinate reference is used because, as will be shown later, the type of memories we are primarily concerned with here are of the magnetic plate apertured type in which information is located by reference to a pair of perpendicular coordinates.

The outputs of the X and Y matrices are each fed into the appropriate X and Y part of a memory address selection unit 16. The unit on suitable actuation presents the X and Y matrix outputs to either an A memory 17 or a B memory 18.

Control over which memory unit, A or B, will receive the address information is in the unit designated as memory transfer 19. The memory transfer in turn is caused to control the selection of either the A memory or the B memory by the combination of a special operation instruction and specific address words. Also, during this word time when one or the other of the memories is being selected, the specific address words forming part of the total word required to make the change are prevented from normally addressing either of the memory units and thus performing unwanted operations.

Still referring to FIG. 1 and also the chart of FIG. 2, a sample program will be gone through in order to illustrate the general operation of the invention. Assume also that initially the operation is being conducted with B memory 18.

As line 1 of the chart shows, the first instruction is for an addition operation where the operation command is 01 and the address to the memory is 0001. The second instruction is to subtract and is so signalled by the operation word 10 and the address information provided is 0011. The third instruction to add another number once more and, accordingly, the operation word is again 01 and the address has been modified.

However, in line 4, we come to a special instruction to select memory A which is signified in the operation section by a 11 and in the address section by 1111. It will suffice at this time to note that this instruction word provides actuation signals from the decoder 13 and the Y-matrix causing the memory transfer to control the memory address selection unit thereby causing all address information to be presented to the A memory 17.

Now that we are in memory A, the next program from the program memory 10 is that of add, or as before 01–0001, only this time the operation is being carried out in memory A. Again, a subtraction instruction 10–0011 and a subsequent addition instruction 01–0010 is carried out. Assuming now that it is desired, for one reason or another, to return to B memory 18, the instruction in the last line 11–1110 is given which actuates the memory transfer 19 which in turn controls the memory address selection unit 16 to disconnect memory A from the matrices and simultaneously operably connect their outputs to memory B.

It is believed important at this time to examine in detail the fundamental differences between the conventional addition and subtraction instructions and the special instructions used to select the different memories since it is upon this broad basis that the invention rests. The addition operating instruction used here consists of the binary word 01 and the corresponding subtraction word is 10. The four bits which follow the operating code and comprise the address portion of the instruction word in the case of addition and subtraction serve to identify the particular locations within the memory, or in other words, perform a normal addressing function to the particular memory being used. However, the special memory select instruction words can be considered an operating instruction of four bits, no part of which is acting to address any location in either memory. Accordingly, by the use of this special pair of programming instructions, the normal memory addressability of the computer, either one but not both the A and B memories, is increased twofold and complete addressability of both A and B memories is now obtained and without increasing the instruction word magnitude.

The operation instruction 11 used for both memory selections can be a type of operation word which in many computers is normally available for other purposes. Such an instruction word, sometimes termed a Discrete Output (DO), is customarily made available in the computer for performing a variety of different functions, such as lighting lights, set or resetting flip-flops or latches and energize or de-energize relays upon command of the computer itself.

*Detailed structure*

The A, B and program memories may, in general, be any of a number of different units normally used in apparatus of this type. For example, either magnetic drum, ferrite toroidal core, ferrite apertured plate or electrostatic type computer memories are equally satisfactory for present purposes. One such a memory unit which is particularly effective in the operation of the invention is to be found in co-pending application, Serial No. 770,667, now Patent No. 2,988,732, entitled Binary Memory System, A. W. Vinal, filed October 30, 1958 and assigned to the same assignee as the present invention. The memory described in connection with a preferred embodiment of the invention is of this type. Briefly, this momory unit is of the ferrite apertured plate type consisting of a plurality of plates 20 composed of a ferromagnetic material having a high degree of squareness ratio. The plates are provided with a plurality of openings arranged in a spaced grid-like configuration through which pass wires 21 is a special arrangement for carrying selected currents that place different areas of the magnetic plate in a specific magnetic state and also for sensing predetermined magnetic states set up within the plate. X and Y address drivers 22 and 23, respectively, are provided for converting the address information into usable form for addressing the memory proper.

For details of the memories, reference can be made to the above-mentioned Vinal application. In particular, see the read-write address 26, X matrix 21 and Y matrix 23 illustrated in FIG. 1 of the application and set forth in the specification thereof.

The buffer 11 is a piece of apparatus whose function and theory of operation is well known in the computer art and for that reason the detailed description will not be set forth. A suitable buffer can be found in the same Vinal application cited above, see particularly buffer storage latch 14 in FIG. 1.

The instruction register is comprised of six flip-flops 24–29 having signal and reset inputs responsive to pulse-like electrical information for setting up the One (1) and Zero (0) outputs appropriately. Each of these flip-flops is fed by gates 30–35 for converting the voltage level output of the buffer 11 into suitable pulse-like electrical values to actuate the flip-flops.

Reset can be accomplished in any predetermined timed relation that is compatible with other operations of the computer. Cyclically appearing pulse energy is conventionally provided by a computer, which is sometimes referred to as clock pulses.

The decoder 13 comprises four AND gates 36–39, the input of each receiving a discrete pair of the outputs of the two flip-flops 24 and 25 of the operation part of the instruction register. More particularly, AND gate 36 receives the Zero output from flip-flop 24 and the Zero output from flip-flop 25, AND gate 37 receives the Zero output from flip-flop 24 and the One output from flip-flop 25, and in like manner the AND gates 38 and 39 receive the remaining two combinations of outputs, respectively. Therefore, when any pair of output situations of the flip-flops of the operation portion of the register 12 is obtained, one and only one output is obtained from the decoder 13. For example, if both flip-flops 24 and 25 have their output set to the One condition, then only the AND gate 39 will be actuatel and the other three AND gates 36–38 will be down.

The memory address selection unit 16 is composed of two identical subparts, 40 and 41 for the A and B memories, respectively. Only the unit 41 is shown in detail and it is seen to comprise eight three-input AND gates 42–49. The prime input to these gates is the eight outputs of the X and Y matrices. One gating actuation pulse is obtained from the Zero output of a transfer flip-flop 50 and the second gating actuation pulse is obtained from the output of AND gate 39. The outputs of gates 42–45 are fed into the X address driver 22, whereas those of gates 46–49 are fed into Y address driver 23.

The A memory selection unit 40 differs from B memory selection 41 in that one of the control gating pulses is the One output of the flip-flop 50 rather than the Zero output as before. Also, of course, its output is fed into the X and Y drivers of the A memory.

Figure 3:
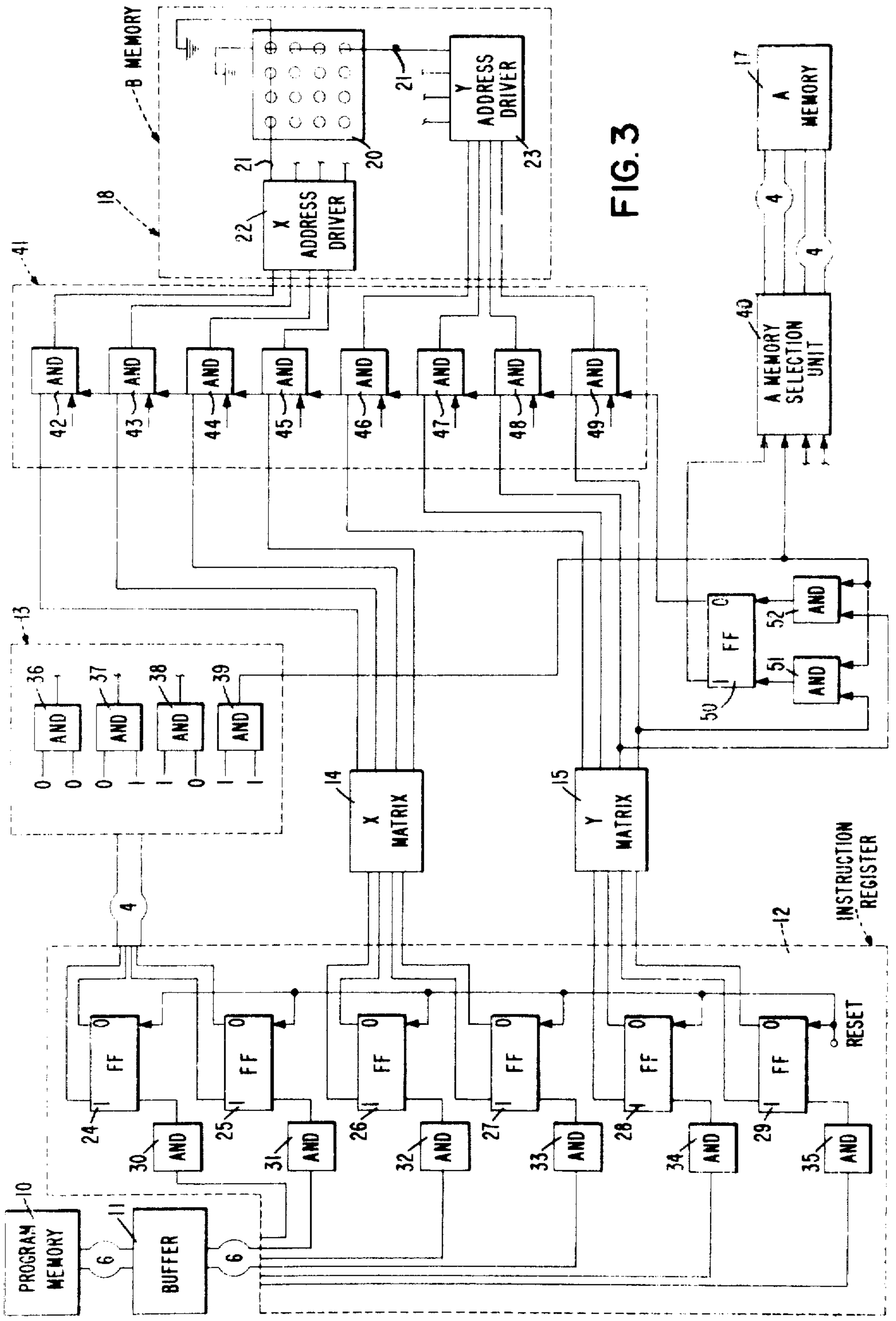
FIG. 3 is a detailed showing of a preferred embodiment.

Referring now to both FIGS. 2 and 3, the detailed operation of the memory selection system of the invention will be set forth illustrating particularly its application to the sample series of operations shown in the graph of FIG. 2. Assume now that the memory B is in operative relation to the remainder of the computer, i.e., the flip-flop 50 is set to provide a Zero output and also that a series of supplementary instructions such as the addition and subtraction commands illustrated in the first three lines of the graph in FIG. 2 have been performed and that the instruction of line 4 is being read out of the program memory.

The buffer receives the instruction 111111 and operates on it in a well-known way to provide precise discrete output signals which are then fed into the instruction register setting up each of the flip-flops 24–29 to provide a One output.

With each of the flip-flops in the register now set to provide a One output, the AND gate 39 in the decoder 13 will be actuated to provide an output which is fed into AND gates 51 and 52 simultaneously. Also, at this time, the lower line output of the Y-matrix illustrated as corresponding to 1111 in the address portion of the instruction word is now provided with an output signal which is fed into the other input terminal of the AND gate 51 thereby impulsing the set terminal of the flip-flop 50 driving the One output to the One condition and the Zero output to the Zero condition. This serves to enable A memory selection 40 and disable B memory selection 41.

The succeeding addition and subtraction operations are performed as shown in lines 5, 6 and 7 of the chart in FIG. 2 utilizing the A memory. Now a second change memory instruction is received from the program memory, 11–1110, for the purpose of reselecting memory B. Again, the instruction as with all the others is buffered and set up in the instruction register 12. Since the operation part of the instruction word is 11 as before, this will provide the same output to be fed into the AND gates 51 and 52. Now, however, since the last position of the address word is a 0, this will cause a new output line of the Y matrix 15 to be up and the lower line to be down. The output of the Y matrix now causes the AND gate 52 to be actuated impulsing the reset terminal of the flip-flop 50 transferring the One output to the down condition and the Zero output to the up condition. Accordingly, the A memory selection unit 40 is disabled and the B memory selection unit 41 is once again enabled.

It is, therefore, apparent that through the practice of the invention, the memory capabilities particularly with respect to the memory addressability can be increased two-fold without necessitating an increase in the instruction word with the associated necessary redesign of the various functional blocks comprising the computer. In fact, it is not to be considered that the invention is confined to the selection of but a single auxiliary memory, but may be used to obtain a selection of several such additional memory units by the utilization of other instruction words in combination with a similar set of actuating and memory selection means described herein.

Additionally in this connection, it is to be noted that although in the detailed description of a preferred embodiment of the invention, the program memory 10 and the memories A and B were discussed as being distinct and separate entities, this is not meant to confine the invention to this particular situation. In fact, it is contemplated that the program information could also be contained in either, or both, A and B memories. Also, the A and B memories can be either separate units or integral parts of a single large memory.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A computer system comprising: a coded electrical signal source consisting of a predetermined total discrete number of electrical signals presented simultaneously and repetitively as an output, said total discrete number of electrical signals having a fixed portion for addressing and the remainder for operation commands; first and second memories having a combined number of addressable locations greater than the number of combinations provided by the number of discrete electrical signals available for addressing; mutually exclusive gating means selectively actuable to connect either memory to the addressing output of said signal source; and means for selectively actuating said gating means in response to predetermined output signal arrangements of said signal source where said predetermined output signal arrangement is utilized solely to select either memory.

2. A computer system comprising: a coded electrical signal source having a fixed number of separate outputs for providing simultaneous outputs in parallel relation, a predetermined part of said outputs being utilized for computer operation commands and the remainder for memory addressing; a memory unit having an addressing capacity greater than that provided by the part of said outputs being utilized for memory addressing; means for storing the source outputs in parallel; first means actuable to connect the output of said storing means to a portion of said memory unit; second means actuable to connect the output of said storing means to a different portion of said memory unit; and means responsive to certain coded combinations of the operation and addressing portions of said source output for actuating said first connection means and responsive to certain other combinations of the source outputs for actuating said second connection means where said certain coded combinations of the operation and addressing portions of said source output are utilized solely to select either portion of said memory unit.

3. A computer system as in claim 2, wherein said connection means individually comprise a plurality of AND gates the inputs of which are fed by the separate outputs of said storing means and the outputs of which are fed to the memory, said gates being controlled by said actuating means.

4. A computer system as in claim 2, in which further means are provided to prevent operation of said memory during actuation of said first and second means.

5. A computer system as in claim 3, wherein said actuation means includes a bistable device having a first input impulsable to provide a first output signal and a second input impulsable to provide a second signal and when one of said inputs is impulsed the other of said outputs is in a deenergized state, said first output operably connected to the input of the AND gates of said first connection means and said second output being connected to the input of the AND gates of said second connection means; and means for impulsing the first input of said actuation means when said certain combinations of the source output are received by said storing means and for impulsing the second input of said actuation means when said other combinations of source outputs are received by said storing means.

References Cited by the Examiner

UNITED STATES PATENTS

| | | | |
|---|---|---|---|
| 2,932,688 | 4/1960 | Wright et al. | 178—2 |
| 2,959,351 | 11/1960 | Hamilton | 340—172.5 |
| 2,962,213 | 11/1960 | Namian | 340—172.5 |
| 3,061,192 | 10/1962 | Terzian | 235—157 |

OTHER REFERENCES

Pages 2–56–59, 1959, Handbook of Automation Computation and Control, volume 2, by Grable, Ramo and Wooldridge.

ROBERT C. BAILEY, *Primary Examiner.*

STEPHEN W. CAPELLI, MALCOLM A. MORRISON, *Examiners.*